(12) United States Patent
Bashteen

(10) Patent No.: US 9,430,596 B2
(45) Date of Patent: Aug. 30, 2016

(54) SYSTEM, METHOD AND APPARATUS FOR A SCALABLE PARALLEL PROCESSOR

(75) Inventor: Asghar Bashteen, Cupertino, CA (US)

(73) Assignee: Montana Systems Inc., Rolling Hill Estates, CA (US)

( * ) Notice: Subject to any disclaimer, the term of this patent is extended or adjusted under 35 U.S.C. 154(b) by 1043 days.

(21) Appl. No.: 13/494,913

(22) Filed: Jun. 12, 2012

(65) Prior Publication Data

US 2012/0323549 A1    Dec. 20, 2012

Related U.S. Application Data

(60) Provisional application No. 61/496,900, filed on Jun. 14, 2011.

(51) Int. Cl.
*G06F 17/50*       (2006.01)
*G06F 15/82*       (2006.01)

(52) U.S. Cl.
CPC ......... *G06F 17/5045* (2013.01); *G06F 15/825* (2013.01); *G06F 2217/68* (2013.01)

(58) Field of Classification Search
CPC .............. G06F 17/5045; G06F 15/76; G06F 2217/68; G06F 15/825
See application file for complete search history.

(56) References Cited

U.S. PATENT DOCUMENTS

| | | | | |
|---|---|---|---|---|
| 4,298,954 A | * | 11/1981 | Bigelow | G06F 5/16 710/53 |
| 4,701,844 A | | 10/1987 | Thompson et al. | |
| 4,882,673 A | * | 11/1989 | Witt | G11C 29/16 714/42 |
| 5,126,966 A | | 6/1992 | Hafeman et al. | |
| 5,293,500 A | | 3/1994 | Ishida et al. | |
| 5,875,293 A | * | 2/1999 | Bell et al. | 714/27 |
| 6,047,367 A | | 4/2000 | Heller, Jr. et al. | |
| 6,163,793 A | | 12/2000 | Gerber et al. | |

(Continued)

FOREIGN PATENT DOCUMENTS

| | | |
|---|---|---|
| CN | 102207916 A | 10/2011 |
| EP | 0 332 362 A2 | 9/1989 |
| JP | 54107239 A | 8/1979 |

OTHER PUBLICATIONS

Tom Blank, "A survey of hardware accelerators used in computer-aided design," 1984, IEEE Design & Test, vol. 1, issue 3, pp. 21-39.*

(Continued)

*Primary Examiner* — Aniss Chad
*Assistant Examiner* — Russ Guil
(74) *Attorney, Agent, or Firm* — Saile Ackerman LLC; Stephen B. Ackerman; Billy Knowles

(57) ABSTRACT

A system and method of parallel processing includes a computer system including a first processor, the first processor being a control flow type processor, a second processor, the second processor being a data flow type processor. The second processor is coupled to a second memory system, the second memory system including instructions stored therein in an order of execution and corresponding events data stored therein in the order of execution. A first one of the instructions are stored at a predefined location in the second memory system. The system also includes a run time events insertion and control unit coupled to the first processor and the second processor. The first processor, the second processor and the run time events insertion and control unit are on a common integrated circuit.

23 Claims, 10 Drawing Sheets

(56) References Cited

U.S. PATENT DOCUMENTS

| | | | |
|---|---|---|---|
| 6,178,492 | B1 | 1/2001 | Matsuo |
| 6,738,895 | B1 | 5/2004 | Klein |
| 7,996,203 | B2 | 8/2011 | Xiao et al. |
| 2001/0007114 | A1* | 7/2001 | Iizuka .................. G06F 13/385 710/100 |
| 2007/0074195 | A1 | 3/2007 | Liao et al. |
| 2007/0169042 | A1 | 7/2007 | Janczewski |
| 2007/0219771 | A1* | 9/2007 | Verheyen et al. .............. 703/15 |
| 2010/0023729 | A1 | 1/2010 | Jackson et al. |
| 2010/0153934 | A1 | 6/2010 | Lachner |
| 2011/0167417 | A1 | 7/2011 | Kobori |
| 2011/0213949 | A1 | 9/2011 | Jayasimha et al. |

OTHER PUBLICATIONS

"Mixed-signal and dsp design techniques," 2000, Analog Devices, 72 pages.*

"Dataflow computers: their history and future," 2008, in "Wiley Encyclopedia of Computer Science and Engineering," 2008, John Wiley and Sons, pp. 1-12.*

Jurij Silc et al., "Dataflow Processors," 1999, in "Processor Architecture," by Jurij Silc et al., Springer-Verlag, pp. 55-97.*

F. Ryckbosch et al., "Fast, accurate, and validated full-system software simulation of x86 hardware," 2010, IEEE Micro, vol. 30, issue 6, pp. 46-56.*

Ben Lee et al., "Dataflow Architectures and Multithreading," 1994, Computer, vol. 27, issue 8, pp. 27-39.*

Donald W. Oxley, "Motivation for a combined data flow-control flow processor," 1981, SPIE Real Time Signal Processing, vol. 298, pp. 305-311.*

John Sanguinetti, "Chapter 16—Digital Simulation", Jan. 1, 2006, CRC Press, XP055169562 ISBN: 978-0-84-937923-9, Section 16.7. 2, 16 pages.

EP 12 80 0997 Search Report, Feb. 17, 2015, 3 pages.

International Search Report—dated Aug. 17, 2012—(2 pages).

Michael S.Schlansker, B. Ramakrishna Rau, Scott Mahlke, Vinod Kathail, Richard Johnson, Sadun Anik, Santosh G. Araham, "*Achieving High Levels of Instruction-Level Parallelism with Reduced Hardware Complexity*", Computer Research Center, HPL-96-120—Nov. 1994 (87 pages).

Tien-Fu Chen, "*Data Prefetching for High-Performance Processors*", Department of Computer Science and Engineering, University of Washington, Seattle, WA 98195, Jul. 1993 (158 pages).

Michael S.Schlansker, B. Ramakrishna Rau, "*EPIC: An Architecture for Instruction-Level Parallel Processors*" Compiler and Architecture Research, HP Laboratories Palo Alto, HPL-1999-111, Feb. 2000 (81 pages).

Gurindar S. Sohi, Amir Roth, "*Speculative Multithreaded Processors*", Computer.Org/CISEPORTAL(Apr. 2001) (pp. 66-72) University of Wisconsin-Madison.

* cited by examiner

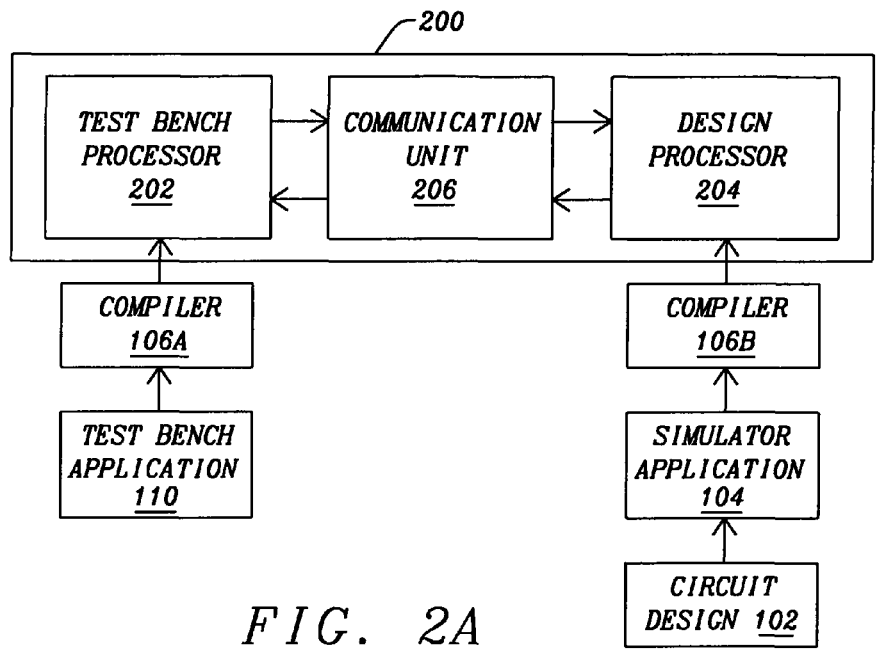
FIG. 2A
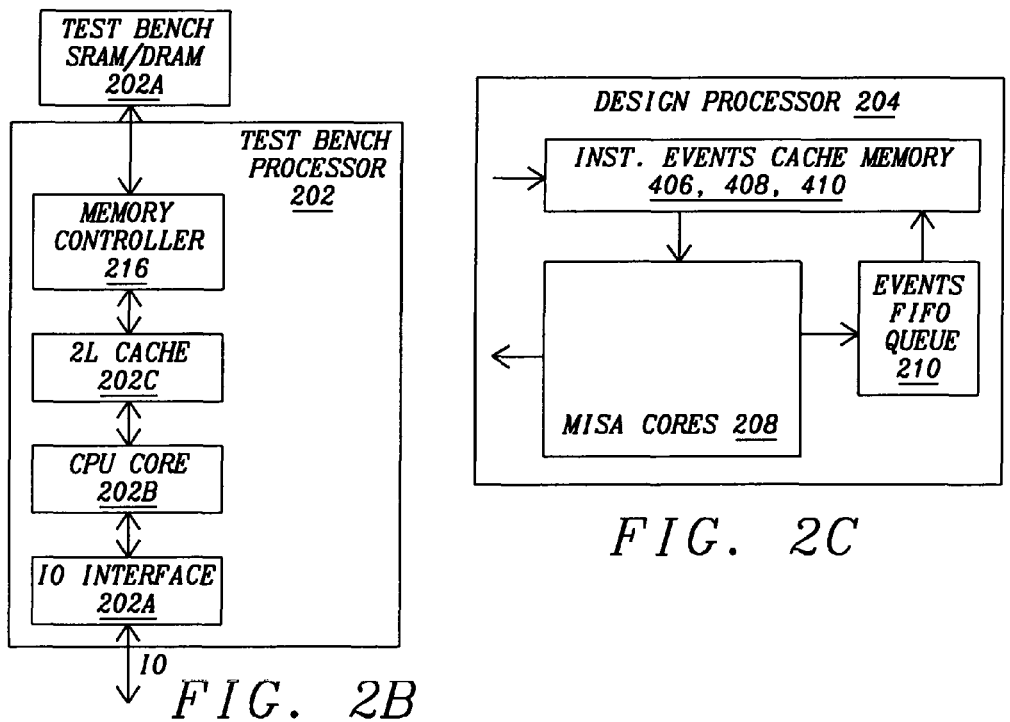
FIG. 2B
FIG. 2C

SYSTEM, METHOD AND APPARATUS FOR A SCALABLE PARALLEL PROCESSOR

CROSS REFERENCE TO RELATED APPLICATIONS

This application claims priority from U.S. Provisional Patent Application No. 61/496,900 filed on Jun. 14, 2011 and entitled "Scalable Parallel Processor for Functional Verification Application," which is incorporated herein by reference in its entirety for all purposes.

BACKGROUND

The present invention relates generally to microprocessor operations and architecture, and more particularly, to systems, methods and apparatus for a scalable microprocessor having improved memory access.

Main memory access latency is one of the biggest factors affecting performance of many applications deployed on typical servers having one or more typical processors. Functional verification of an integrated circuit design is one such application with larger than average memory latencies. The large memory latencies substantially slow the run time speed.

Memory latency slows down performance of many general purpose applications (e.g., a verification application) on typical server platforms. The typical processor architectures are control flow processors (e.g., von Neumann). A program is a series of addressable instructions in a control flow processor. Each addressable instruction either specifies an operation along with memory locations of the operands or specifies conditional or unconditional transfer of control to some other instruction. At any point in the execution flow, the address of the next instruction may not be known and will only be known once the processor gets to the next instruction.

A sequence of instructions is used to describe an element in the design to be verified in a verification application. To execute the sequence of instructions which evaluate the functionality of an element in the design, frequent accesses across the processor memory hierarchy are required to fetch the data operands needed for the evaluation.

The design configuration is known at the beginning of the design verification process. The design being verified is typically highly parallel in that many of the elements in the design can be evaluated without either data or control dependency on other elements in the design at a given time within the evaluation cycle and therefore can be evaluated simultaneously. The design configuration, the individual elements therein and the interconnectivity thereof does not change during the design verification process. While the design and configuration does not change during the design verification process, the data flow through the design elements typically does change as instigated by other components of the verification application (e.g., a test bench).

The highly parallel design is serialized by a typical simulator application program which may be a commercially available software package. The typical simulator software package converts the design into a C program. The C program describing the design is then compiled by a standard C compiler (e.g., a GNU compiler collection type compiler or any other suitable compiler), and loaded into memory at whatever available memory location. This process is intended to satisfy the control flow processing model for a typical control flow type processor. The memory latency at runtime is exacerbated due to the randomness of the instruction execution and the randomness of main memory DRAM accesses.

A dataflow processing model could be more efficient, since the execution is driven by the availability of operands. However, a dataflow processing model will not efficiently work as the structure and the connectivity of the design must be preserved in memory, which is not possible to do with standard compilation techniques.

FIG. 1 is a block diagram of a typical server based verification platform 100. A design 102 being verified can be in either RTL or gate form (e.g., Verilog, VHDL, etc.) and is compiled by a simulator application 104. The simulator application compiles the design 104 using a standard C compiler 106 and a data structure 112 and is loaded into a typical server's 120 memory system 108. The memory system 108 includes DRAM 108A. The server 120 also includes a standard CPU 122, cache memory 124, system controller 126 and mass storage 128 (e.g., disk or hard drive or other suitable mass storage technologies).

The application that controls and drives the design 102 being verified is called a test bench 110. The test bench 110 is also compiled and then loaded into the server memory system 108. The compiled design 102 being verified and the compiled test bench 110 are linked at run time and share the same memory layout space in the memory system 108. The data structure 112 includes data and instructions for each of the system 112A, simulator 112B, design 112C and test bench 112D.

The test bench application 110 is often compiled separately using the same compiler 106C and/or after going through transformations for input to a C compiler 106A. A typical server 120 is used to execute the verification application. The server 120 is also used as the platform for the verification application's software ecosystem. A linker 106B interlinks the test bench application and the design simulation. A loader 106D loads the compiled, interlinked and combined test bench application 110 and the design 102 into the system memory 108. The test bench 110 acts as a gate to the runtime execution of the application, since the test bench generates the stimulus for the design 102 and, can also check the response once the result of a prior test bench 110 stimulus is evaluated.

The test bench 110 application and the design 102 often have distinct and conflicting profiles. The test bench 110 application can be highly serial and un-parallelizable code while the design 102 is highly parallel and is organized into serial code by the simulator application program to fit with the control flow processor execution model. The typical server 120 with a typical CPU 122 is not optimized to efficiently execute such an odd mix of different types of software applications compiled into one executable. As a result the memory latency is excessively large.

The memory latency does not improve at the same rate as the processor speed. Based on semiconductor industry precedents, memory latency has historically improved at a rate of about 2× every 10 years. Thus, memory latency is a bottleneck that slows processing of many applications.

Previous attempts at improving the compatible performance of the verification application have failed to deliver a programmable solution. Almost all gains have come from accelerators and emulators. Accelerators only speed up the synthesizable part of the design through logic synthesis and mapping to a field programmable gate array (FPGA) or an application specific integrated circuit (ASIC). The accelerators are not able to accelerate the test bench as is written and execute it seamlessly. Using both emulators and accelerators, the test bench application must execute on a standard server and communicate with the design which has been previously synthesized on an FPGA or an ASIC through a communication channel The communication between the test bench and the design through the communication channel dramatically slows down the execution of the entire verification application. The design plus test bench plus productivity software delays, communications times and processing times provides a total time delay required for execution of each instruction.

In view of the foregoing, there is a need for a system, method or apparatus that provides a more efficient execution of applications that substantially or entirely eliminates memory latency and thus allows an application to execute more efficiently and more quickly.

SUMMARY

Broadly speaking, the present invention fills these needs by providing a system, method or apparatus that provides a more efficient execution of the applications that reduces or entirely eliminates memory latency and thus allows an application to execute more efficiently and more quickly. It should be appreciated that the present invention can be implemented in numerous ways, including as a process, an apparatus, a system, computer readable media or a device. Several inventive embodiments of the present invention are described below.

One embodiment provides a computer system including a first processor, the first processor being a control flow type processor, a second processor, the second processor being a data flow type processor. The second processor is coupled to a second memory system, the second memory system including instructions stored therein based on design connectivity and corresponding events. The system also includes a run time events insertion and control unit coupled to the first processor and the second processor. The first processor, the second processor and the run time events insertion and control unit are on a common integrated circuit.

The first processor can include a first cache memory, a first memory controller, a first CPU core and the first processor can be coupled to a first memory system. The second processor can include a second cache memory, a second memory controller and multiple Montana Instruction Set Architecture (MISA) processing cores coupled in parallel.

The second processor can be coupled to the first processor by communication FIFO's. The second cache memory can include an instruction cache memory and an events cache memory. The second memory system can include an instruction memory and an events memory, wherein the instruction memory is coupled to the instruction cache memory by a first corresponding memory controller through a prefetch unit, the events memory is coupled to the events cache memory by a second corresponding memory controller through the prefetch unit.

The second processor can also include an events FIFO queue coupled to a prefetch unit. The multiple MISA processing cores include between about 1 and about 128 MISA processing cores.

Another embodiment provides a method of testing a design including compiling a test bench application in a first compiler, loading the compiled test bench application in a test bench memory system coupled to a test bench processor. The test bench processor is a control flow type processor. A design is compiled in a second compiler. The compiled design is loaded into a design memory system coupled to a design processor. The design processor is coupled to the test bench processor by communication FIFO's. The communication FIFO's include a runtime events insertion and control FIFO. Loading the compiled design application in the design memory system includes a storing multiple instructions in an order of design connectivity and storing a corresponding events data. A first instruction is executed in the design processor according to an output of a corresponding first instruction in the test bench processor.

The method can also include comparing an output result from the executed first instruction in the design processor with a current data value. A next instruction is loaded when the output result from the executed first instruction in the design processor is different than the current data value. Loading the next instruction can include loading a subsequent instruction into a control memory cache and simultaneously loading a corresponding subsequent event data into an events data cache.

The method can also include storing the output result when the output result from the executed first instruction in the design processor is different than the current data value. Storing the output result can include storing the output result in an events cache memory and loading a next instruction in the instruction cache memory of the design processor.

The first compiler can be a functional equivalent of the second compiler. The first compiler and the second compiler can be C compilers. Compiling the design in the second compiler can include compiling the design in a MISA compiler.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 2A is a block diagram of a parallel processor system, in accordance with embodiments of the present invention.

FIG. 2B is a block diagram of the test bench processor, in accordance with embodiments of the present invention.

FIG. 2C is a block diagram of the design processor, in accordance with embodiments of the present invention.

DETAILED DESCRIPTION

Figure 1:
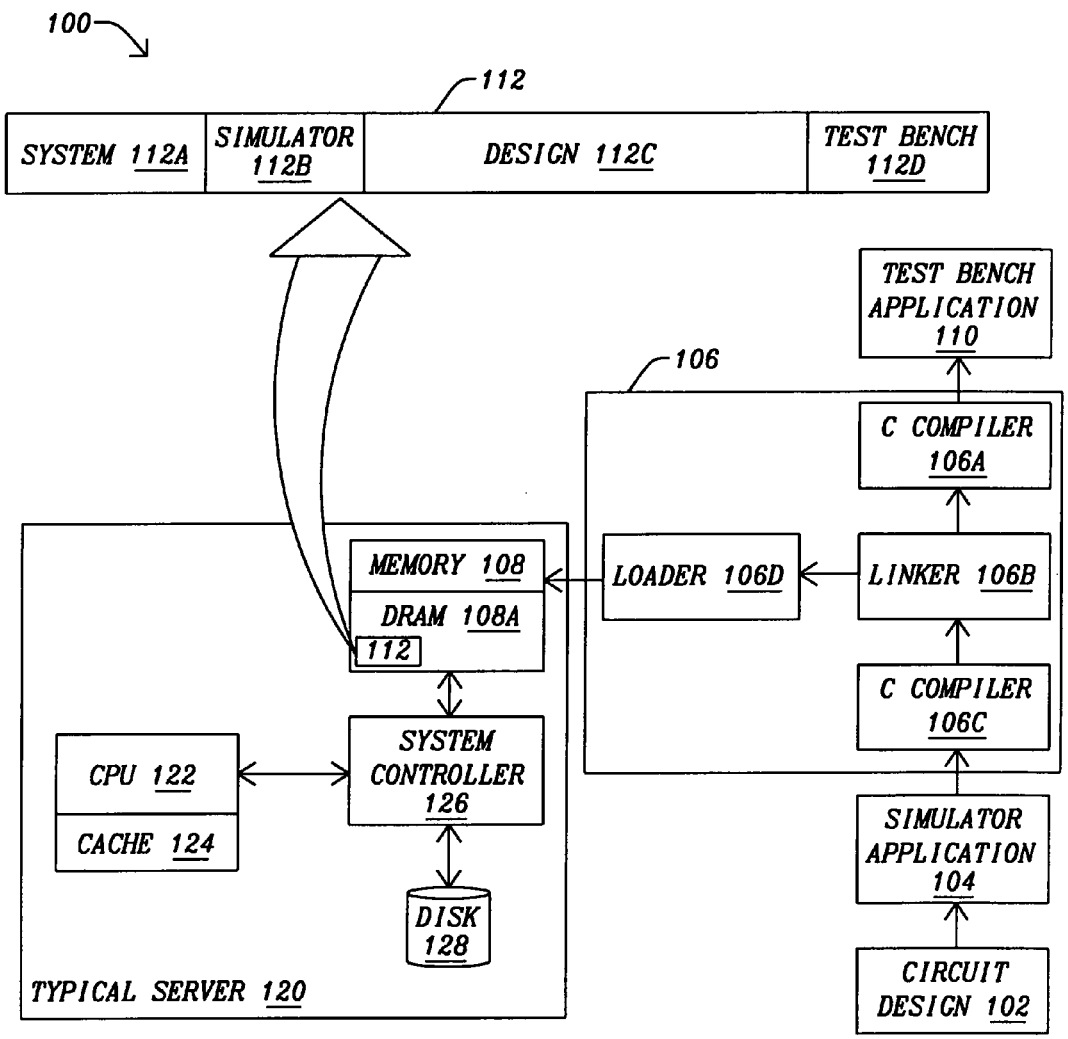
FIG. 1 is a block diagram of a typical server based verification platform.

Several exemplary embodiments for systems, methods and apparatus that provide a more efficient execution of verification application of logic circuits and system that reduces memory latency and thus allows a verification application to execute more efficiently and more quickly will now be described. It will be apparent to those skilled in the art that the present invention may be practiced without some or all of the specific details set forth herein.

Main memory latency is a primary factor limiting performance of many applications including the verification application used to verify design functionality. One approach to improving system performance of the simulation of logic circuits and systems (e.g., processing speed) due to the memory latency bottleneck can be addressed by a scalable, parallel processor architecture described in more detail below. The demonstrated performance improvements are orders of magnitude greater than the processor systems typically used. Combinations of hardware and software techniques are used to minimize the main memory latency. The design's inherent parallelism is used as an enabling hardware and software instrument.

The memory latency bottleneck for the exemplary verification application of logic circuits and systems is reduced by compiling the design into a uniform instruction set which is then loaded into the processor memory system. The instruction thus representing the design element has the information about the element location relative to all other instructions (e.g., at a fixed, known address) which comprise the design. This allows the processor to "know" the entire make up of the design, the location of the design elements in memory and data dependencies in the memory system. The design is thus compiled into an efficient instruction set architecture and stored in known locations in the memory system and can be accessed in a streaming fashion without incurring any substantial memory latency.

The parallel processor system described herein is different than past attempts to accelerate using accelerator and emulator logic circuits to speed up the synthesizable part of the design through logic synthesis. The parallel processor system combines the control flow and data flow processing into one unique entity.

FIG. 2A is a block diagram of a parallel processor system 200, in accordance with embodiments of the present invention. The system 200 includes a test bench processor 202 and a design processor 204 that operate in parallel. A runtime events insertion and control logic 206 links the test bench processor 202 and the design processor 204. In operation the test bench processor 202 applies the tests to the design simulated in the design processor 204.

The test bench processor 202 is a control flow type processor as control flow type processing is the most efficient way to process a test bench application. The test bench processor 202 can be any suitable reduced instruction set computing (RISC) processor. The test bench processor 202 is dedicated to processing the test bench application. The test bench processor 202 executes the test bench application and generates stimulus (e.g., events) that are output to the design processor 204.

The performance of the test bench processor 202 is enhanced by an off chip static random access memory (SRAM) in the test bench memory 202A, in place of a synchronous dynamic random access memory (SDRAM) with a predictable, deterministic and fast access time which allows for even faster execution time. The test bench memory 202A can be any size. For example, the test bench memory 202A can be about 16 MB executing at 250 MHZ QDR or 1 GHZ regular clock speed to match the memory speed used for the control memory 212A, and events data memory 212B, 212C.

Multiple test bench processors 202, operating in parallel, could be included, depending on the need. For example a first test bench processor 202' could be processing the test bench application while a second test bench processor 202" could be processing the input/output intensive tasks and a third test bench processor 202'" could be managing exceptions, errors and recovery tasks and other related exceptional events.

The design processor 204 is a data flow type processor as a data flow type processor is the most efficient processor for evaluating a design. The design is compiled and loaded into its dedicated memory and is assigned to the dedicated design processor 204. The design processor 204 executes the design elements which are represented by instructions.

Using the two processors 202 and 204 in parallel reduces the memory latency bottleneck. An improved memory utilization scheme further reduces the memory latency bottleneck. Unlike the typical servers and simulator solutions where the test bench and design are processed on the same CPU and are serialized as explained above, this parallel processor system 200 decouples the test bench processing from the design processing since each is assigned its own respective, dedicated processor. An additional benefit of the parallel processor system 200 is that the scalability of the system 200 is not limited by the principals of Amdahl's law.

The test bench processor 202 and the design processor 204 can be included in a single integrated circuit (i.e. chip) thus avoiding most communication delays. The test bench processor 202 and the design processor 204 can also be included within the same clock boundaries.

A test bench application 110 is compiled in a first compiler 106A. The compiled test bench application is then loaded into the test bench processor memory for the test bench processor 202.

A design 102 is compiled in a second compiler 106B. The compiled design is then loaded into the design processor memory 212A, 212B, 212C for the design processor 204.

It should be understood that the first compiler 106A and the second compiler 106B can be either the same compiler or different compliers. In at least one embodiment, the first compiler 106A and the second compiler 106B are the same compiler however it may be more efficient in some instances to use two different compilers.

FIG. 2B is a block diagram of the test bench processor 202, in accordance with embodiments of the present invention. The test bench processor 202 includes an I/O interface 220 for communicating with systems external to the test bench processor. The test bench processor 202 also includes a CPU core 202B, at least one level of cache memory 202C and a memory controller 216. The memory controller 216 is used by the test bench processor 202 to access and control the test bench memory 202A. The test bench memory 202A is used to store the test bench code.

The I/O interface 220 includes one or more various standard interfaces such as USB, Ethernet, PCI express and HT (Hyper Transport) as may be desired. The I/O interface 220 provides communication between the parallel processor 200 and the rest of the system which the parallel processor is coupled to. Simultaneous transfer of data to and from the parallel processor system 200 to the rest of the system is possible by deploying various interfaces.

FIG. 2C is a block diagram of the design processor 204, in accordance with embodiments of the present invention. The design processor 204 includes multiple MISA cores 208, an events first in first out (FIFO) queue 210, and a memory system including instruction cache memory 406 and events cache memory 408.

Figure 3:
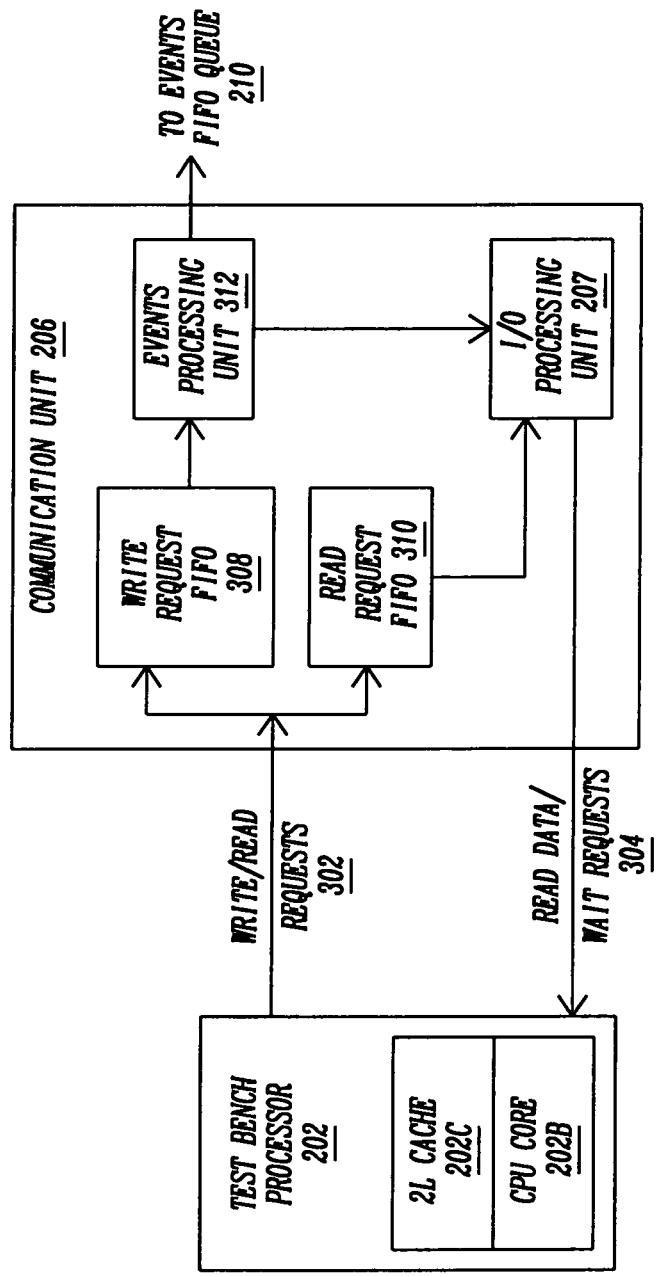
FIG. 3 is a block diagram of the runtime events insertion and control unit, in accordance with embodiments of the present invention.

FIG. 3 is a block diagram of the runtime events insertion and control unit 206, in accordance with embodiments of the present invention. The runtime events insertion and control unit 206 includes a write request first in first out (FIFO) buffer 308, a read request first in first out (FIFO) buffer 310 and an I/O processing unit 207.

In operation, the test bench processor 202 sends read and write requests 302 to the read and write request FIFOs 308, 310. The write request FIFO 308 sends the write requests to the events processing unit 312 for processing. The read request FIFO 310 sends the read requests to the I/O processing unit 207 to access the desired memory location. The test bench application can intervene at anytime and change the events input data which is used for the design verification. The test bench read and write requests 302 are stored in the respective FIFO 308, 310. The test bench read and write requests 302 are then processed in the received order.

An events processing unit 312 asserts a waitrequest 304 control signal when the design processor 204 is not ready to process the test bench read and write requests 302. The test bench processor 202 receives the waitrequest 304 control signal and thus determines the test bench processor must wait.

An additional function of the runtime events insertion and control unit 206 is that any read or I/O request which the test bench processor 202 sends to the design processor 204 can be processed and the request compiled, without any performance impact, since the read requests share a different hardware queue (e.g., read FIFO 310) to manage the requested transactions than the write requests hardware queue (e.g., write FIFO 308). Moreover the data paths dedicated to the event processing are not impacted by the test bench read and write requests 302 and the I/O transactions are done concurrently with the event processing.

The Amdahl's law effect is substantially reduced and substantial performance targets are achieved by decoupling the test bench processing in the test bench processor 202 from the design in the design processor 204. Therefore there is no serialization of runtime execution. The test bench application executes faster in a parallel processor system 200 than in a typical processors, since the test bench application does not have to wait for the processor resources to become available due to the processor being used to verify the design.

Figure 4A:
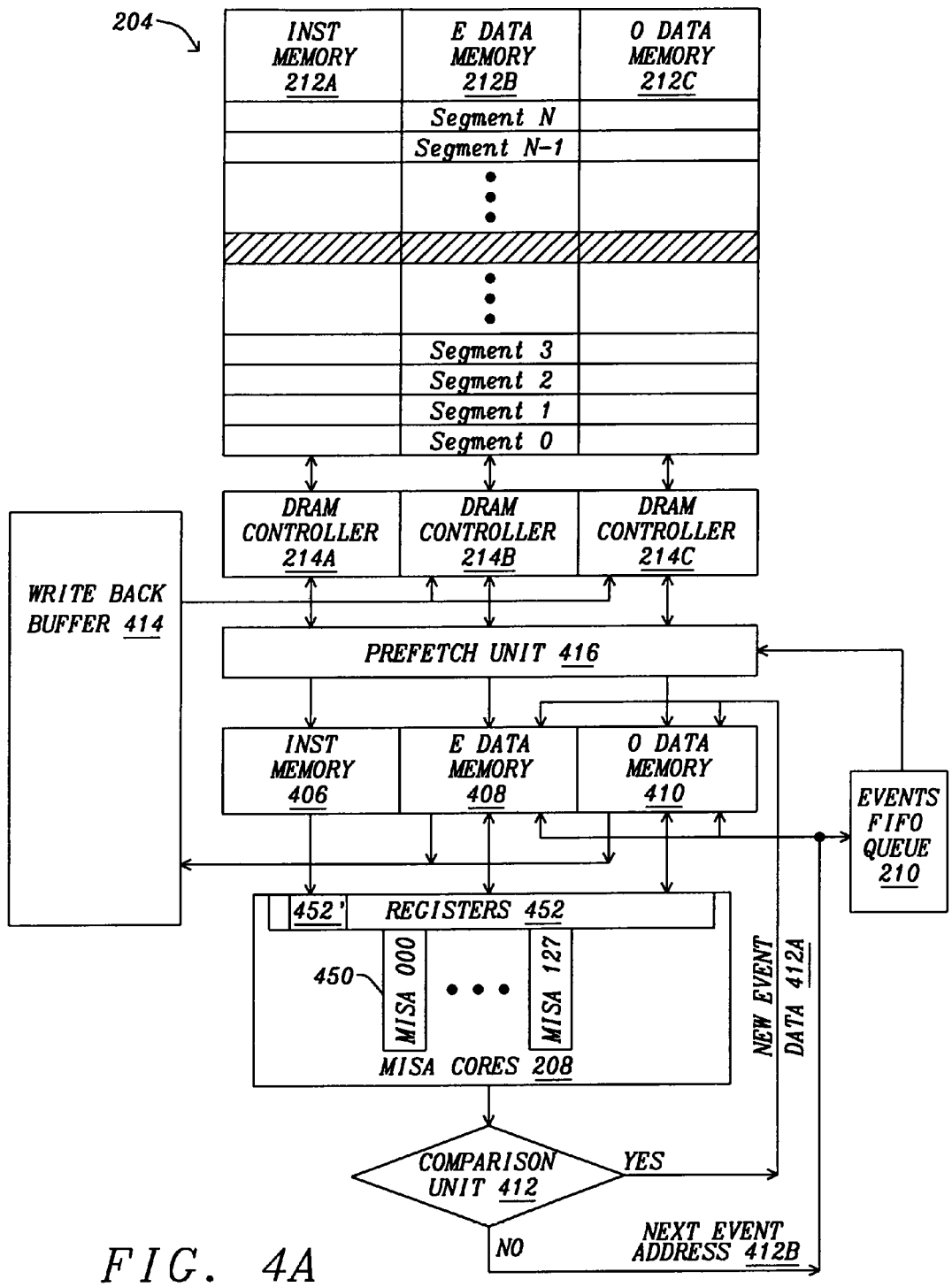
FIG. 4A is a more detailed block diagram of the design processor, in accordance with embodiments the present invention.

FIG. 4A is a more detailed block diagram of the design processor 204, in accordance with embodiments the present invention. The parallel processor system 200 can process multiple tasks associated with design constructs simultaneously. Verifying a design function may include one or more of the following tasks, some of which can be done concurrently:

(a) 2 state functional evaluation;
(b) 4 state functional evaluation;
(c) (a) or (b) with integer delays;
(d) (a) or (b) with strength properties as defined by standards;
(e) (a) or (b) with electrical delays (SDF timings);
(f) (a) or (b) or (c) or (d) or (e) and I/O tasks.

Figure 4B:
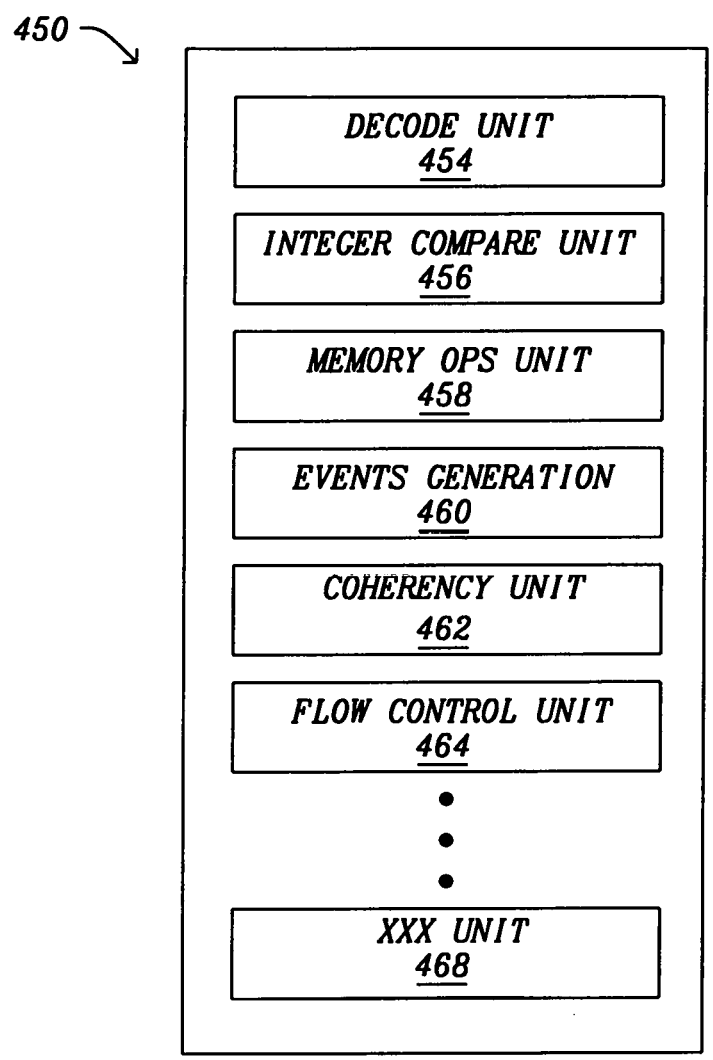
FIG. 4B is a block diagram of the MISA core, in accordance with embodiments the present invention.
Figure 4C:
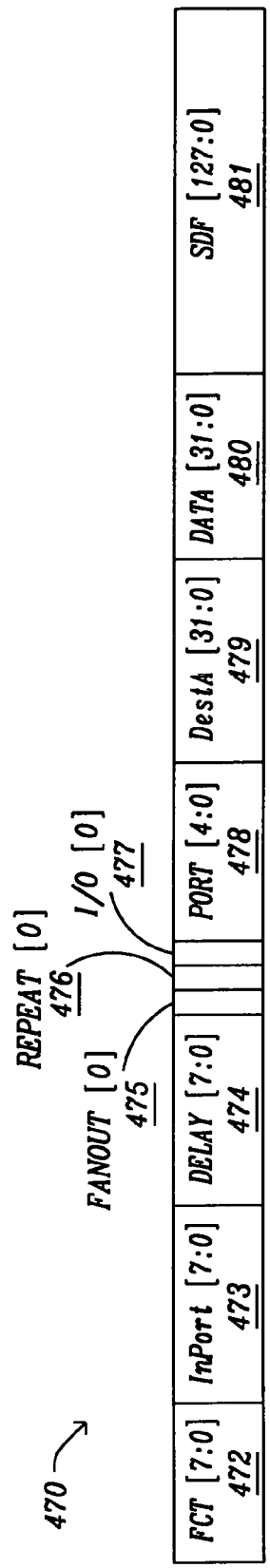
FIG. 4C is a data structure, in accordance with embodiments the present invention.

The design processor 204 includes multiple MISA cores 208 that process the design. The design is compiled into Montana Instruction Set Architecture (MISA). The design processor 204 can include between 1 to 128 MISA cores 208 or even more as needed. The MISA cores 208 perform various computational functions such as arithmetic and logic functions, flow control and memory operations In the implementation shown in FIG. 4A, the design processor 204 includes 128 MISA cores 208. FIG. 4B is a block diagram of a single MISA core 450, in accordance with embodiments the present invention. FIG. 4C is a data structure 480, in accordance with embodiments the present invention. The MISA core 208 processes the Montana instruction set data structure which is produced by a MISA compiler 534 compiling the verification application. Depending on the performance required and the memory interface availability, additional MISA cores 208 can be added or removed from or enabled or disabled in the design processor 204 by enabling bits in a processor status register 452' that is part of multiple registers 452 in the design processor.

The MISA cores 208 are scalable in that they can operate at the same frequency as the external memory interface or slower. By way of example, if the memory interface is operating at 533 MHz, then a single MISA core 208 can operate at 533 MHz or two MISA cores can operate at 266 MHz or four MISA cores can operate at 133 MHz or any other number of MISA cores. The processing speed of the MISA cores 208 determines, in large part, the power consumption of the cores. Slower processing speeds consume less power and higher speeds consume more power. Thus selecting the number and speed of the MISA cores 208 enabled in processor status register 452' can be used to manage power consumption when limiting power consumption is a desired operating point.

Each of the MISA cores 208 is not dependent on of the other MISA cores that may or may not be present. Thus, each MISA core 208 can operate independent of the other MISA cores.

As shown in FIG. 4B, a single MISA core 450 can include a decode unit 454, an integer compute unit 456, a memory ops unit 458, an events generation unit 460, a coherency unit 462, a flow control unit 464 and other processing units 468.

The data structure 470 includes 224 bits including an 8 bit function field 472 that defines one of the 256 different instructions included in the MISA instructions set. More or fewer than 8 bits can be used in the function field 472 if fewer or more different instructions are desired. There are no limits on the size of the data operands in the MISA architecture The data structure 470 includes an 8 bit InPort field 473 that defines the number of input bits/bytes/words/double words of data to be used in the next instruction. The data structure 470 includes a 8 bit delay field 474 which defines a number of gate delays needed before a particular function can be executed.

The data structure 470 also includes a 1 bit fanout field 475. The fanout field 475 identifies if the result of this instruction is to be distributed to other nodes than the defined output node.

A 1 bit repeat field 476 is used to identify instructions to be repeated. A 1 bit I/O field 477 is used to identify that the result of the current instruction is to be output to an I/O subsystem.

The data structure 470 also includes a 5 bit port field 478 that identifies the exact location of the output port destination. A 32 bit destination field 479 is the next address for the next instruction. A 32 bit data field 480 includes the data to be operated on in the current instruction.

The data structure 470 also includes an SDF field 481 that defines the electrical timing specification of the function.

The decode unit 454 decodes the MISA data structure 470 based on the function field 472, InPort field 473, delay field 474, fanout field 475, repeat field 476, I/O field 477 and directs the correct compute function to perform the required task as dictated by the function field.

The integer compute unit 456 performs standard integer compute functions such as ALU functions, data movements, replications, splits, concatenations, buffering, etc. These functions are invoked via the MISA core and data operands that are fed into the integer compute unit.

The memory ops unit (MOU) 458 performs all memory operations to and from internal memory 406, 408, 410 and external memory 212A-C. There are load and store instructions that work in conjunction with memories 212A-C, 406, 408, 410 and perform all data movements inside the processor. The MOU 458 also initiates the memory read requests and write operations to internal memory 406, 408, 410 and external memory 212A-C.

The events generation unit 460 determines when and if a new event is to be stored in the event queue for some future execution or not stored. There are a number of criterion that determine if a new event is to be stored based on the execution outcome of the integer compare unit 456 and memory ops unit 458. The criterion can include: Is the new output different from previous cycle output? Is an unconditional invocation required? Is the destination of the new event to be reached through jumps and conditional computations?

The coherency unit 462 maintains coherency between internal memory 406, 408, 410 and external memory 212A-C that contain the MISA instructions and data operands.

The flow control unit 464 decides where to direct the next cycle operations based on the status of all resources in the core at a given time. If the event queue 210 is emptied and there are no more coherent events to be evaluated, then the state of the execution is advanced to the next cycle and internal registers are updated to reflect the status change.

The IO and system transactions are processed differently by the flow control unit 464. System write requests and read requests are processed based on the TestBench (TB) requirements as initiated by the test bench processor 202. The MISA core 208 generates system accesses such as providing the data to the system based on a MISA execution are granted at the time that they are available based on the flow of the design code being executed. The requested system data is then written to FIFO 210 where they can read by the system based at a time decided by the system.

Concurrent processing uses multiple MISA cores 208. For example, to process task (e), the processor must evaluate a function, decide on the logical transition of the function and then calculate the associated delays for the transition. This task requires concurrent processing. While a typical processor consumes a large number of processing cycles and memory accesses to accomplish this same task, in sharp contrast the parallel processor system 200 needs just one memory access and one processing cycle to complete this task.

The design processor 204 operates on the operand of every entity that is activated. Every processing cycle produces new events data 412A (events are the data changes at the input of a design node that activate the design elements which then need to be processed) that need to be scheduled for processing in the next cycle. The new events data 412A is generated at runtime and is transient and is held in the events FIFO queue 210. As the current events are read from the events FIFO queue 210 and are evaluated, the generated next cycle events are written into the events FIFO queue 210 from the other end. As a result, event management can be viewed as management and control of the events FIFO queue 210.

The design processor 204 also includes two distinct on chip memories 406, 408, 410 which are utilized to process a function or a gate or an event. It should be noted that processing a function or a gate or an event are interchangeable processes for the purpose of describing the computational aspects of the parallel processor system 200. A control memory 406 contains the instructions to be executed at runtime (i.e., control). The data memory or event caches 408, 410 are used to store both initial data of the design as well as runtime transient (e.g., generated) data. The data memory or events memory is further divided in two sections. Current cycle data are read from one section, either E or O, concurrent with its instruction. The next cycle data (E or O) are stored into the other one. For example, if in the current cycle, control and E data(event) memory are read and executed, next cycle data are stored in the O data(event) memory.

The instruction memory cache 406 and the event data memory cache 408 are loaded with the instructions and events data, respectively, for the next cycle of calculations, by the prefetch unit 416.

The prefetch unit 416 uses the corresponding DRAM controllers 214A, 214B, 214C to retrieve and/or store the information in the corresponding control memory 212A and events data memory 212B and 212C. The events FIFO queue 210 instructs the prefetch unit 416 where to retrieve or store the data for next processing cycle.

As instructions are fetched along with their respective data from on chip memory 406, 408, 410 and then executed, a next cycle data and addresses are generated when there is a change of status between the current output of the evaluated function and the previous output data. The current instruction contains the previous cycle output data and therefore a comparison unit 412 can compare the new event data 412A from the currently executed instruction and a previous event data 412B from the previous cycle execution to determine whether the next cycle memory requires updating or not updating with the information about the new event. The information, whether updated or not will be evaluated in the next cycle.

If the new event data 412A is different from the previous event data 412B from the previous cycle execution, then the next cycle memory requires updating. Updating the next cycle memory includes writing the address of the next cycle event into the events FIFO 210. At the start of the next processing cycle, addresses of the instructions are read from the events FIFO 210 and executed accordingly.

During operations, the writeback buffer 414 data are written to one of the data memories 212B-212C while simultaneously a next cycle data is fetched from the other data memory using the prefetch unit 416. Therefore, the existing cycle generated data is streamed to memory 212B-212C while simultaneously reading the next event from the same memory The comparison unit 412 compares the output of the MISA cores 208 to determine if the output of the MISA cores is new data that needs to be stored. If the output of the MISA cores 208 does not need to be stored, then the comparison unit 412 notifies the events FIFO queue 210 to retrieve or store the data for the next cycle of calculations.

If an operation does not result in generation of a bit output, as may be the case with many operations which operate on multiple operands, then that operation's destination address is triggered and used as the next cycle event regardless of the state of the output. In this instance the next operation is implied and there is no need for output comparisons in the comparison unit 412.

This process continues until the existing cycle events are executed and are written into the events FIFO 210. At the end of this processing cycle, two tasks are completed: The newly generated events data are written back to main memory 212B and 212C using a writeback buffer 414 and simultaneously the addresses of the newly generated events are fed into a prefetch unit 416 so that the remaining new events data are read from main memory 212A-C and brought inside the design processor 204 for execution. This process assures one cycle memory accesses without incurring any memory latency.

The control memory 212A, events data memory 212B, 212C are external from the design processor 204 (i.e., off chip), and can be very nearby i.e., on the same circuit board as the design processor 204. The organization of data within the memory locations of the control memory 212A, the events data memory 212B and 212C is significant as is the organization of the data reduces the memory latency bottleneck and thus improves throughput by orders of magnitude in some instances.

Figure 5:
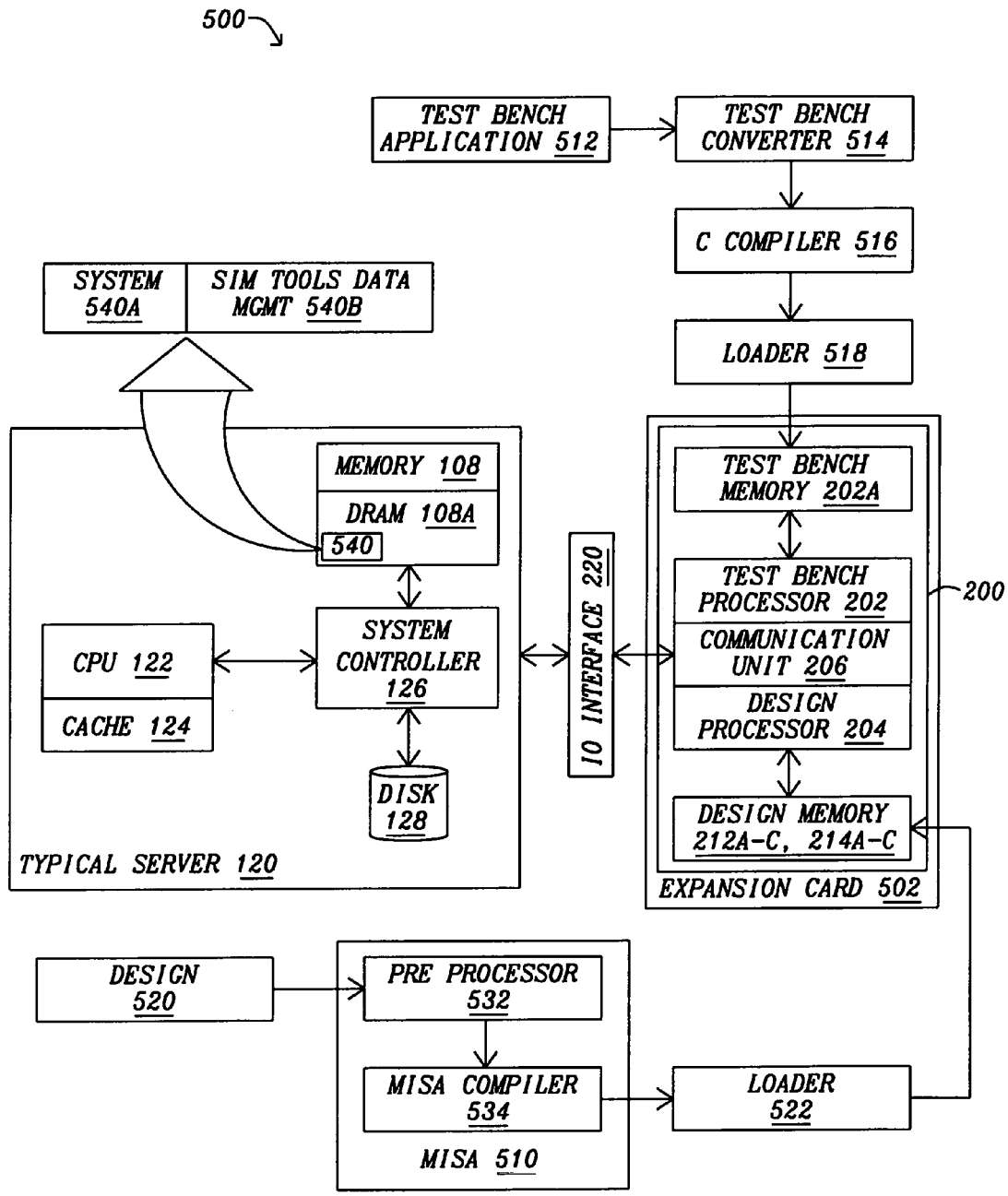
FIG. 5 is a parallel processor system included in an exemplary design verification system, in accordance with embodiments of the present invention.
Figure 6A:
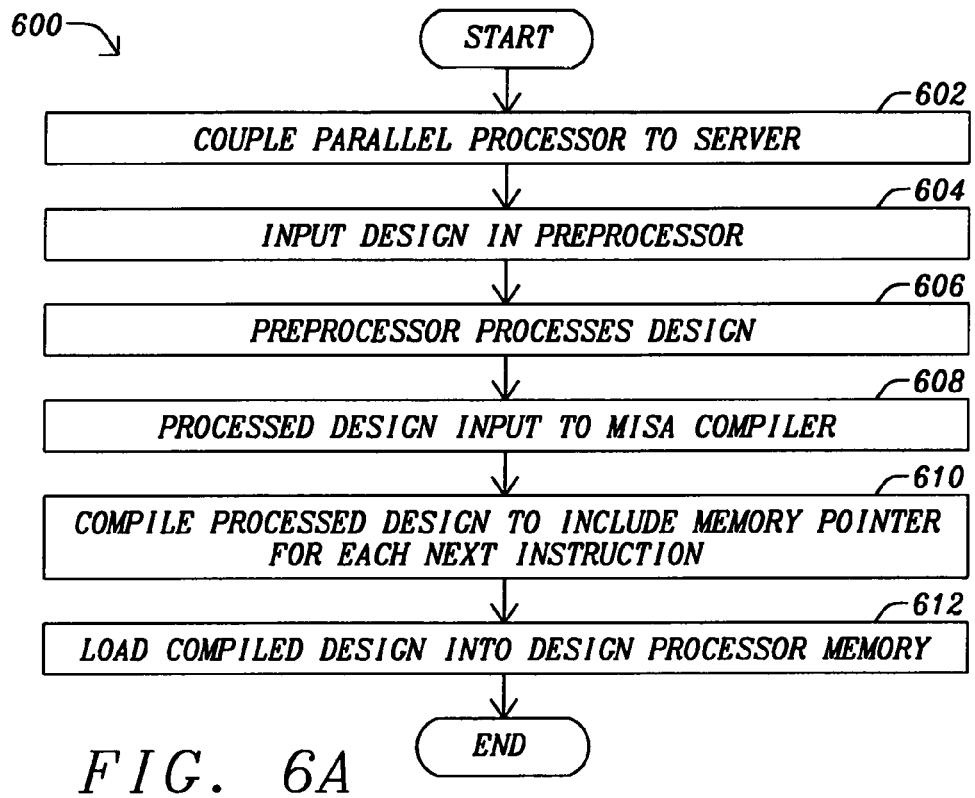
FIG. 6A is a flowchart diagram that illustrates the method operations performed in preparing the design for execution in the parallel processor, in accordance with one embodiment of the present invention.

FIG. 5 is a parallel processor system 200 included in an exemplary design verification system 500, in accordance with embodiments of the present invention. FIG. 6A is a flowchart diagram that illustrates the method operations 600 performed in preparing the design for execution in the parallel processor 200, in accordance with one embodiment of the present invention. The operations illustrated herein are by way of example, as it should be understood that some operations may have sub-operations and in other instances, certain operations described herein may not be included in the illustrated operations. With this in mind, the method and operations 600 will now be described in conjunction with design verification system 500.

The parallel processor 200 and its associated memory can be housed on an expansion card 502 (e.g., a PCI card or any other suitable standard interface cards) or directly on a computer motherboard along with various interface components as described above. In an operation 602, the parallel processor 200 is coupled to a typical server 120 via the I/O interface 220. As described above, the I/O interface 220 can be a USB interface or any other suitable data coupling system (e.g., Ethernet, PCI, PCI express, optical network, wireless network, etc.). The typical server 120 can be a PC or any other such computer system which contains any of the corresponding interfaces.

The design 520 can be any suitable expression of a design (e.g., Verilog, VHDL, etc.). The design 520 is compiled into the design processor's 204 instruction set by a parallel processor system ISA compiler (MISA) 510. The MISA compiler 510 compiles the design directly to the parallel processor ISA, i.e., a native compile. The MISA compiler 510 has two main parts: a preprocessor 532 and an ISA compiler 534.

In an operation 604, the preprocessor 532 parses and optimizes the design into a format which describes the functional dependency of the design elements and outputs the data structure 470 containing this functional dependency in an operation 606. The input to the preprocessor is a standard design language and the parsing and optimization functions can also be standard features provided by the standard commercial software packages available on the market or in the open source form.

In an operation 608, the parsed preprocessor 532 output is input to the MISA compiler 534. In an operation 610, the MISA compiler 534 generates a set of assembly level code which is then directly loaded into the design processor SDRAM memories 212A-C by loader 522, in an operation 612.

The MISA compiler 534 preserves and uses the connectivity information of the design from the preprocessor 532 to provide a pointer to the location of the next instruction and the place within the total memory space of the design or memory layout of the design. The memory pointer and the memory location are used by the design processor 204 at runtime to enable prefetching of the instructions from memory, thus enabling the reduction of the memory latency to almost zero. The only delay that occurs while fetching instructions from memory is the delay required to activate a page in memory and read the contents of the activated memory page. Ample time is available to activate the memory page before reading the contents which are the instructions and the data that are needed for the next stage of the execution.

Figure 6B:
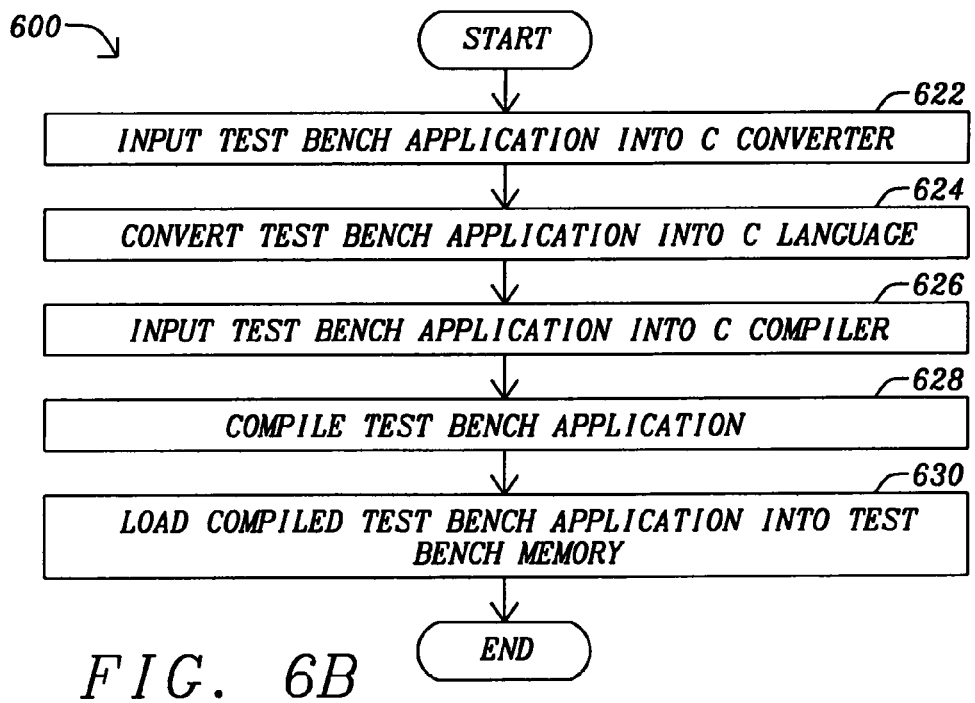
FIG. 6B is a flowchart diagram that illustrates the method operations performed in preparing the test bench application for execution in the parallel processor, in accordance with one embodiment of the present invention.

FIG. 6B is a flowchart diagram that illustrates the method operations 620 performed in preparing the test bench application for execution in the parallel processor 200, in accordance with one embodiment of the present invention. The operations illustrated herein are by way of example, as it should be understood that some operations may have sub-operations and in other instances, certain operations described herein may not be included in the illustrated operations. With this in mind, the method operations 620 will now be described in conjunction with the design verification system 500 as shown in FIG. 5.

The test bench application 512 can be any suitable test bench application (e.g., a C language, Vera, e, HDL, etc.). In an optional operation 622, if the test bench application 512 is not a C language application, then the test bench application 512 is loaded into a C programming language converter 514. In an operation 624, the test bench application 512 is converted into C programming language by converter 514.

The converted test bench application is input to a typical C compiler 516 in an operation 626. The converted test bench application is compiled using a typical C compiler 516 in an operation 628. A loader 518 loads the compiled test bench application into the test bench memory 202A in an operation 630.

Figure 6C:
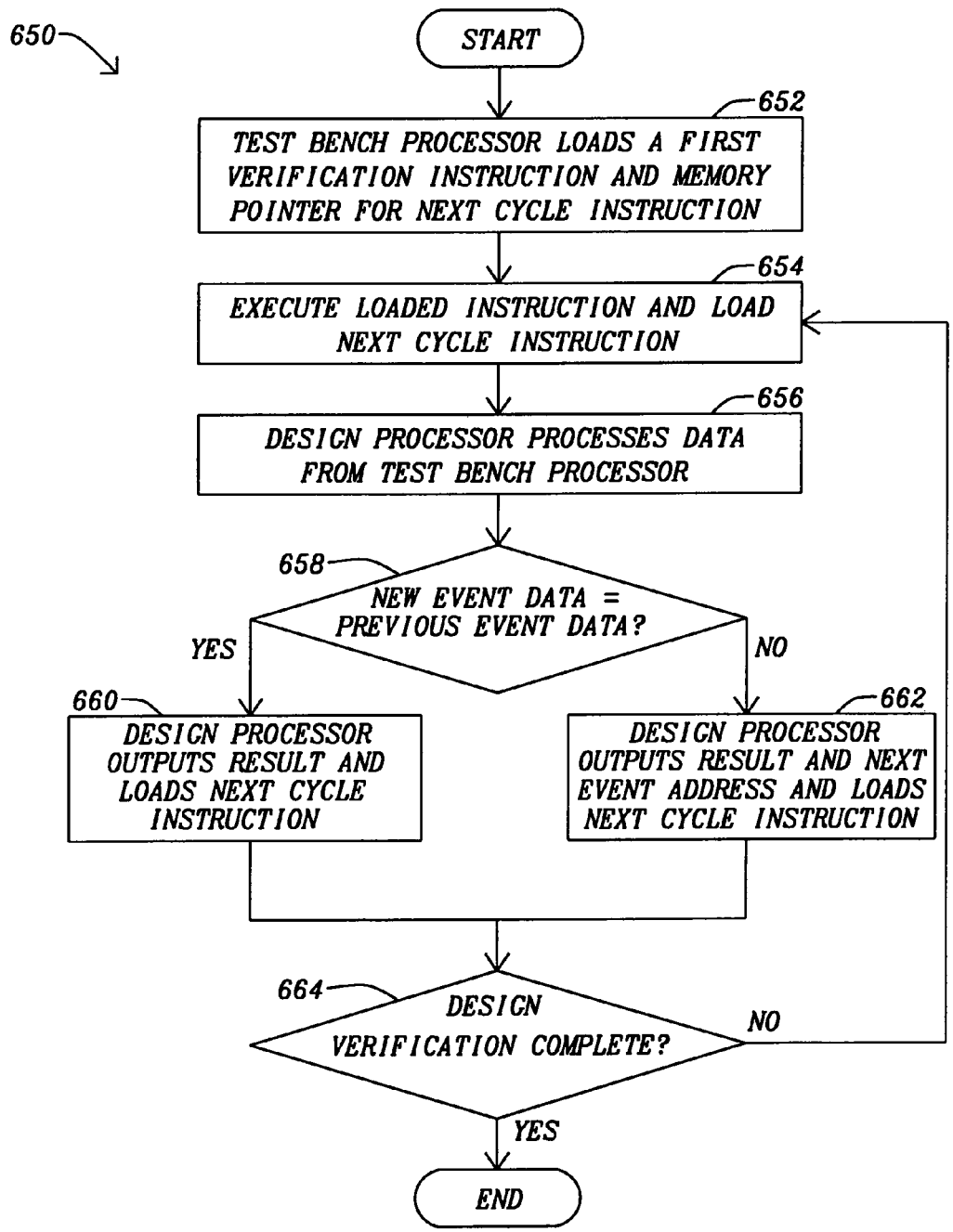
FIG. 6C is a flowchart diagram that illustrates the method operations performed in operating the parallel processor included in an exemplary design verification system 500, in accordance with one embodiment of the present invention.

FIG. 6C is a flowchart diagram that illustrates the method operations 650 performed in operating the parallel processor 200 included in an exemplary design verification system 500, in accordance with one embodiment of the present invention. The operations illustrated herein are by way of example, as it should be understood that some operations may have sub-operations and in other instances, certain operations described herein may not be included in the illustrated operations. With this in mind, the method and operations 650 will now be described. Once the design and test bench application are compiled and loaded onto the parallel processor's 200 memory 212A-C and 202A as described in FIGS. 6A and 6B above, the parallel processor can perform the design verification in the method and operations 650.

In an operation 652, the test bench processor 202 loads a first verification instruction. The first verification instruction includes the memory pointer corresponding to the next instruction to be executed. In an operation 654, the test bench processor 202 executes the loaded verification instruction. Simultaneously, the test bench processor 202 loads the next instruction to be executed.

By way of example, in operation 654, the test bench processor 202 can request from or send a first verification data to the design processor 204 through the communication unit 206. During the current cycle instruction execution, the next cycle instructions are simultaneously fetched and placed in on-chip memory for subsequent use, thus bypassing the memory delays and latency as seen by typical processors 100, due to their control flow processing paradigm.

In an operation 656, the design processor 204 processes the first verification events data. As described above in connection with FIG. 4, the current instruction contains the previous cycle output data and therefore in an operation 658, a comparison unit 412 can compare the new event data 412A from the currently executed instruction and a previous event data 412B from the previous cycle execution to determine whether the next cycle memory requires updating or not updating with the information about the new event that will need to be evaluated in the next cycle.

If the new event data 412A is not different than the previous event data 412B from the previous cycle execution, then only the event data 412A needs to be updated in an operation 660.

If the new event data 412A is different than the previous event data 412B from the previous cycle execution then the next cycle memory requires updating. Updating the next cycle memory includes writing the address 414 of the next cycle event into the events FIFO 210 in an operation 662.

If additional verification instructions are required to complete the design verification, the method operations continue in operation 654 above as determined in an operation 664. If the design verification is completed, then the method operations can end.

The MISA 510 provides compilation and execution of the design without incurring any memory latency. The MISA 510 allows for about 256 or more operations to be defined. The MISA 510 combines the control and data operand into one memory operation. As a result, only one memory fetch is required to get all of the bits of the instruction fields and the data bits needed to complete the operation. The memory latency reduction technique as described above, combined with the MISA 510 and the parallel processor 200 hardware architecture allows for a stream-like fetching and processing of instructions from memory.

The MISA 510 and the parallel processor 200 hardware architecture provide a sustained rate of one operation per one memory cycle. To achieve higher rates (e.g., one half memory cycle per operation), more memory interface can be added. Thus this solution is scalable to achieve higher rates. As an example to evaluate an event in half of memory cycle, an additional control memory and two events data memory for a total of six memory interfaces. Increasing the total number of interfaces to twelve or increase the bandwidth required by other means such as a very high speed interfaces, then the time needed to process an event would decrease to ⅛ of a memory cycle access. This provides a performance gain of 400× higher than 3 memory interfaces which enable performance gain of 100×.

The MISA 510 also provides a dramatic reduction of the memory footprint of the design and the corresponding runtime execution. By way of comparison, a system memory map 540 is shown in FIG. 5 and a typical memory map 112, is shown in FIG. 1.

As described above, the memory used by the design and test bench applications reside on parallel processor 200 card 502 and are not in the server's memory. The typical simulator code is large, typically between about 50 to about 100 MB or more. Once compiled, a typical simulator occupies a large percentage of the server's available memory.

The typical software simulator has a minimum code size which is irrespective of the design size. As the design size increases, the typical simulator's runtime memory usage and working set grow correspondingly larger. As a result, each circuit evaluation requires multiple accesses to and from memory in the typical verification application.

The parallel processor 200 requires only about 2 to about 10 percent of the memory space per gate than the typical simulator system 100. The performance of the parallel processor 200 is constant and deterministic and the memory size and requirements do not change at runtime.

Figure 7:
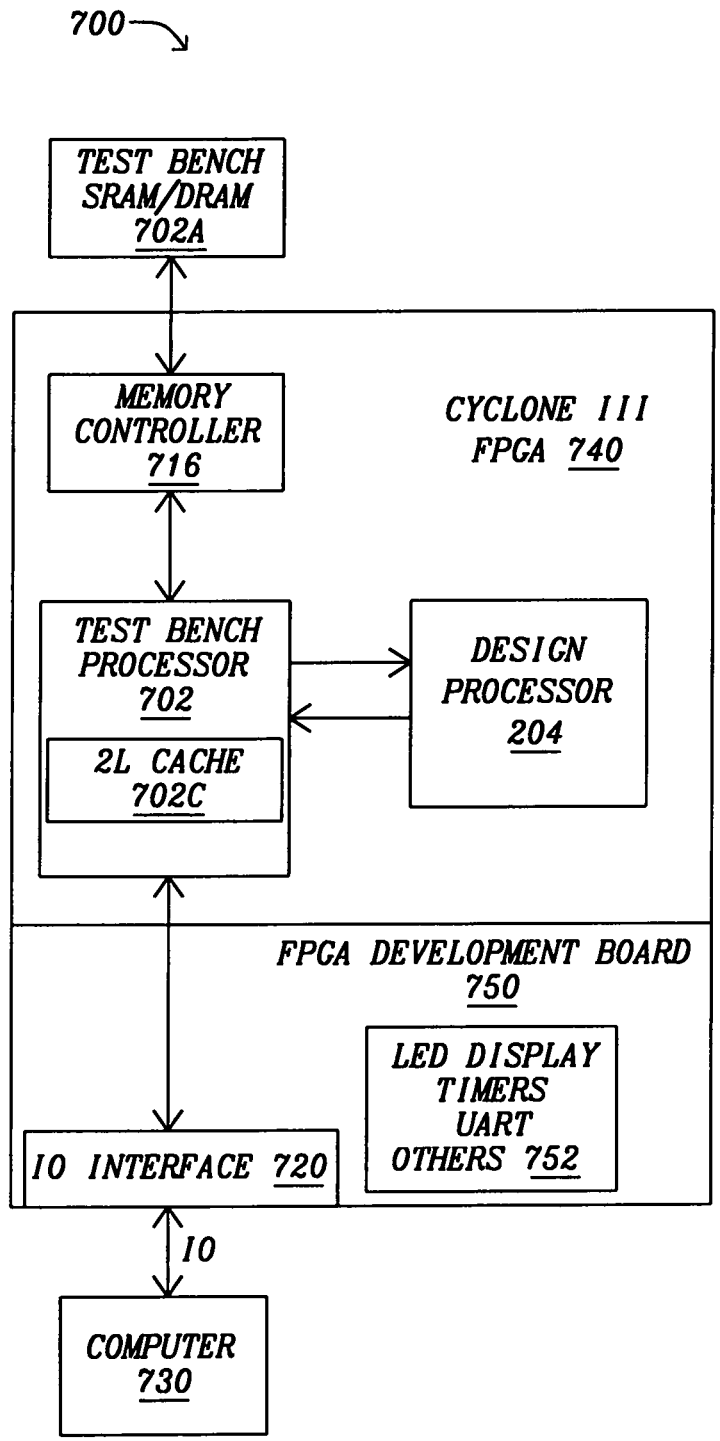
FIG. 7 is a block diagram of an FPGA prototype parallel system, in accordance with embodiments of the present invention.

The parallel processor 200 can deliver 100× or more performance for circuit verification processes, when compared with standard server platforms (e.g., system 100). By way of example the 100× performance gain is arrived at as follows: Evaluating a two input nand gate requires four semiconductor transistors to build. In context of large designs (e.g., designs having more than 1 million events per cycle) in a typical server system, using the commercially available simulator requires about 5 memory accesses. A typical memory access requires about 50 ns. Therefore, evaluating a two input gate in a typical server system would require about 250 ns. In contrast, the MISA processor would require only one memory access without incurring any memory latency. If that MISA processor accesses were 2.5 ns cycle time (such as for a SDRAM memory at 400 MHZ), then that is 100× performance over the typical verification systems. FIG. 7 is a block diagram of an FPGA prototype parallel system 700, in accordance with embodiments of the present invention. The FPGA prototype parallel system 700 design under test uses a Verilog gate level design with a simple Verilog test bench, which contains 96 32-bit adders, each with 192 gates per adder, with a total of about 18,432 gates and approximately 40,000 events. The test bench drives all of the 96 adders simultaneously and in parallel. Simulation hardware and software included Mentor Graphics Modelsim Verilog simulator (Altera Web edition, version 6.1), running on an Intel Core i5 (dual core) processor with a speed of 2.67 Ghz and 4 GB of physical memory.

The FPGA used in the FPGA prototype parallel system 700 is an Altera Cylcone III FPGA running at 50 MHz. The FPGA prototype parallel system 700 includes a test bench processor 702, a design CPU 704, test bench memory 702A and an I/O interface 720 (USB in this embodiment). A memory controller 716 couples the test bench memory to the test bench processor 702. The test bench processor 702 is also coupled to a second level cache 702C.

The test bench processor 702 provides the same functionality as the test bench processor 202, described above with reference to FIGS. 2A-5. The design CPU 704 provides the same functionality as the design processor 204, described above. The I/O interface 720 provides a data communication between the FPGA prototype parallel system 700 to an external computer system 730 for displaying the resulting output data.

The design was compiled into the MISA instruction set as described above. The test bench application for the prototype parallel processor system 700 is a simple C program which performs the same function as the Verilog test bench used with standard, server-based platforms (i.e., system 100, described above). The C test bench application uses the information generated by the MISA compiler 510 during the design compilation to generate operands for the adder. The generated operands are written to the instruction memory address by initiating a test bench processor 702 write request and reading the result of the adder operation after completion of the add operation.

The C test bench was compiled using a C compiler which is part of the Altera NiosII processor development environment. The compiled C test bench was then loaded into the test bench processor memory 702A, 702C.

The design processor 704 was implemented first in Verilog RTL and verified to work using Modelsim simulator and then implemented using the same Altera cyclone III FPGA which also contains the test bench processor 702.

The test bench processor 702 executed the C test bench and was instructed, through the computer 730 connected to the interface 720, to run the test bench and read the result of the operations. All of the 96 32-bit adder bits were tested in this experiment. Approximately 100× performance gain was obtained and verified as compared to the typical server system 100.

It should be understood that the test bench and design embodiments described above are merely exemplary embodiments.

The inventions described herein and portions thereof may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion. .

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer system for simulating a machine design, the machine design comprising a plurality of functional design elements represented by inputs and outputs and functions describing relationships between input and output states, the computer system comprising:
   a control-flow-type processor configured to execute verification instructions specifying test bench inputs of the machine design with which to simulate the machine design;
   a data-flow-type processor configured to execute a plurality of design element simulation instructions that specify functional relationships between input and output states of design elements of the machine design, wherein the data-flow processor comprises:
   an instruction cache memory,
   a first events cache memory,
   a second events cache memory, and
   a prefetch unit;
   an instruction memory coupled to the instruction cache memory of the data flow processor by a corresponding first memory controller through the prefetch unit for receiving the design element instructions;
   a first events data memory coupled to the first events cache memory by a second corresponding memory controller through the prefetch unit;
   a second events data memory coupled to the second events cache memory of the data flow processor by a third corresponding memory controller through the prefetch unit; and
   a run time events insertion and control unit coupled to the data-flow-type processor and the control-flow-type processor, the instruction memory, and the first and second events data memories; and
   a communications interface coupled to the control-flow-type processor and the data-flow-type processor and configured for coordinating parallel execution by the control-flow-type and data-flow-type processors of verification instructions and design element simulation instructions, respectively.

2. The computer system of claim 1, wherein the data-flow-type processor is configured to fetch a design element simulation instruction along with its corresponding input state data with a single memory fetch.

3. The computer system of claim 1, wherein the data-flow-type processor is configured to refrain from fetching a design element simulation instruction until all corresponding input state data becomes available.

4. The computer system of claim 3, wherein the data-flow-type processor comprises on-chip memory, including an instruction portion that stores design element simulation instructions and the first and second events data memories that store input state data.

5. The computer system of claim 4, wherein the first and second events data memories are subdivided into sections that alternately hold current-cycle events data and next-cycle events data.

6. The computer system of claim 1, wherein the data-flow-type processor is configured to compile the machine design into a plurality of data structures, each including both a design element simulation instruction that specifies a relationship between the input and output states of a functional design element of the machine design and a pointer to a next design element simulation instruction that corresponds to a connected design element.

7. The computer system of claim 6, wherein when the data-flow-type processor's execution of the design element simulation instruction generates a changed output, then the data-flow-type processor is configured to execute the next design element simulation instruction identified by the pointer.

8. The computer system of claim 1, wherein the verification instructions include event read and write requests.

9. The computer system of claim 8, wherein the control-flow-type processor is configured to execute verification instructions that include pointers to next verification instructions to be executed, and wherein the control-flow-type processor, while executing any current cycle verification instructions, is configured to fetch and place the next cycle verification instructions in on-chip memory for subsequent use.

10. The computer system of claim 1, wherein the communications interface is configured to process event write requests from the control-flow-type processor, the event write requests specifying input states to the machine design, and send them to the data-flow-type processor when the data-flow-type processor is ready to process them.

11. The computer system of claim 1, wherein the communications interface includes a queue that buffers event write requests from the control-flow-type processor to the data-flow-type processor.

12. The computer system of claim 11, wherein the communications interface is configured to assert a wait request control signal if the control-flow-type processor is not ready to process a write request from the data-flow-type processor.

13. The computer system of claim 1, wherein the communications interface comprises an I/O processor configured to process event read requests by the control-flow-type processor.

14. The computer system of claim 1, wherein the communications interface comprises separate hardware queues for storing read and write requests from the control-flow-type processor.

15. The computer system of claim 1, wherein the communications interface is configured to prevent read and write requests from the data-flow-type processor from impacting data paths dedicated to event processing.

16. The computer system of claim 1, wherein each design element simulation instruction includes a field containing previous cycle output data for the corresponding design element.

17. The computer system of claim 1, wherein the data-flow-type processor further comprises a comparator that compares an output state of a design element in a current simulation cycle with a previous output state in order to determine whether the output state has changed, and if so, to cause storage of the data in an events queue.

18. The computer system of claim 1, wherein the data-flow-type processor is configured to store new events data, representing changes in input states to a design element, generated by execution of a design element simulation instruction, into an events queue.

19. The computer system of claim 18, wherein the data-flow-type processor is configured to write addresses of next cycle events into the events queue.

20. The computer system of claim 18, wherein the events queue directs where a prefetcher retrieves or stores data for a next simulation cycle.

21. The computer system of claim 18, wherein the data-flow-type processor is configured to advance to a next cycle of the simulation when the events queue is emptied.

22. The computer system of claim 1, wherein the data-flow-type processor, the control-flow-type processor and the run time events insertion and control unit are on a common integrated circuit.

23. A computer system comprising:
a control-flow-type processor configured to execute control-flow-type instructions without knowing in advance an address of a next control-flow-type instruction;
a data-flow-type processor that has an instruction set architecture for data-flow-type instructions that informs the data-flow-type processor of an address of a next data-flow-type instruction to be executed, wherein:
the data-flow-type processor includes a plurality of cores, an instruction cache memory, a first events cache memory, a second events cache memory, and a prefetch unit;
the data-flow-type processor is coupled to an instruction memory and first and second data memories;
the instruction memory is coupled to the instruction cache memory by a corresponding first memory controller through the prefetch unit;
the first data memory is coupled to the first events cache memory by a second corresponding memory controller through the prefetch unit; and
the second data memory is coupled to the second events cache memory by a third corresponding memory controller through the prefetch unit; and
a run time events insertion and control unit coupled to the data-flow-type processor and the control-flow-type processor, the instruction memory, and the first and second data memories, wherein the data-flow-type processor, the control-flow-type processor and the run time events insertion and control unit are on a common integrated circuit.

* * * * *